(12) United States Patent
Rijpkema et al.

(10) Patent No.: US 7,809,024 B2
(45) Date of Patent: Oct. 5, 2010

(54) ELECTRONIC DEVICE AND METHOD OF COMMUNICATION RESOURCE ALLOCATION

(75) Inventors: Edwin Rijpkema, Nieuwerkerk a/d Ijssel (NL); John Dielissen, Weert (NL)

(73) Assignee: ST-Ericsson SA, Geneva (CH)

( * ) Notice: Subject to any disclaimer, the term of this patent is extended or adjusted under 35 U.S.C. 154(b) by 42 days.

(21) Appl. No.: 11/915,497

(22) PCT Filed: May 11, 2006

(86) PCT No.: PCT/IB2006/051487

§ 371 (c)(1), (2), (4) Date: Jul. 16, 2008

(87) PCT Pub. No.: WO2006/126127

PCT Pub. Date: Nov. 30, 2006

(65) Prior Publication Data

US 2008/0310458 A1 Dec. 18, 2008

(30) Foreign Application Priority Data

May 26, 2005 (EP) .................................. 05104512

(51) Int. Cl.
*H04J 3/00* (2006.01)
(52) U.S. Cl. .................... 370/498; 370/348; 370/322
(58) Field of Classification Search ......... 370/200–253, 370/272–390, 431–546
See application file for complete search history.

(56) References Cited

U.S. PATENT DOCUMENTS 5,875,309 A * 2/1999 Itkowsky et al. ............ 710/113

7,006,534 B1 * 2/2006 Nemoto ....................... 370/508
7,443,790 B2 * 10/2008 Aicklen et al. .............. 370/228
2007/0274263 A1 * 11/2007 Seki ............................ 370/331

FOREIGN PATENT DOCUMENTS

EP 1605727 A1 12/2005

(Continued)

OTHER PUBLICATIONS

Gossens, K; et al "A Unified Approach to Constrained Mapping and Routing on Network-on-Chip Architectures" Proceedings of the 3rd IEEE/ACM/IFIP International Conference on Hardware/Software Codesign and System Synthesis, Sep. 2005, pp. 75-80.

(Continued)

*Primary Examiner*—Ricky Ngo
*Assistant Examiner*—Iqbal Zaidi

(57) ABSTRACT

An electronic device is provided which comprises an interconnect means (N) for coupling a plurality of processing modules (IP1-IP5) to enable a communication between the processing modules (IP1-IP5). The electronic device further comprises a plurality of network interfaces (NI) for coupling the interconnect means (N) to one of the processing modules (IP1-IP5). Furthermore, at least one time slot allocating unit (SA) is provided for allocating time slots to channels of the interconnect means (N). The time slot allocating unit (SA) comprises a plurality of slot tables (T0-T4) with a plurality of entries. Each entry corresponds to a fraction of the available bandwidth of the interconnect means (N). A first slot table of the plurality of slot tables (T0-T4) comprises at least one first entry of the plurality of entries which relates to a second slot table of the plurality of slot tables (T0-T4).

20 Claims, 5 Drawing Sheets

FOREIGN PATENT DOCUMENTS

| WO | 2005099187 A1 | 10/2005 |
|---|---|---|
| WO | 2006051471 A1 | 5/2006 |
| WO | 2006106475 A1 | 10/2006 |

OTHER PUBLICATIONS

Marchal P; et al "Spatial Division Multiplexing: A Novel Approach for Guaranteed Throughput on NOCS" Proceedings of the 3rd IEEE/ACM/IFIP International Conference on Hardware/Software Codesign and System Synthesis, Sep. 2005, pp. 81-86.

Rijpkema, E; et al "Trade-Offs in the Design of a Router With Both Guaranteed and Best-Effort Services for Networks on Chip" IEEE Proceedings on Computers and Digital Techniques, vol. 150, No. 5, Sep. 22, 2003, pp. 294-302.

Libin, Dong; et al "Effect of Scheduling Jitter on End-to-End Delay in TDMA Protocols" Proceedings of the International Conference on Real-Time Computing Systems and Applications, Dec. 2000, pp. 223-230.

Radulescu, A; et al "Communication Services for Networks on Chip" Proceedings of the International Workshop on Systems, Architectures, Modeling and Simulation, SAMOS, vol. 2, 2002, pp. 275-299.

Sathe, S; et al "Design of a Switching Node (Router) for On-Chip Networks" ASIC, 2003. Proceedings. 5th International Conference, vol. 1, Oct. 2003, pp. 75-78.

\* cited by examiner

ELECTRONIC DEVICE AND METHOD OF COMMUNICATION RESOURCE ALLOCATION

The invention relates to an electronic device having a plurality of processing modules and an interconnect means for coupling the plurality of processing modules as well as to a method of communication resource allocation within such an electronic device.

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load, and the bus constitutes a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Introducing networks as on-chip interconnects radically changes the communication when compared to direct interconnects, such as buses or switches. This is because of the multi-hop nature of a network, where communication modules are not directly connected, but are remotely separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control), which must be handled either by a intellectual property block (IP) or by the network.

A network on chip (NoC) typically consists of a plurality of routers and network interfaces. Routers serve as network nodes and are used to transport data from a source network interface to a destination network interface by routing data on a correct path to the destination on a static basis (i.e., route is predetermined and does not change), or on a dynamic basis (i.e., route can change depending e.g., on the NoC load to avoid hot spots). Routers can also implement time guarantees (e.g., rate-based, deadline-based, or using pipelined circuits in a TDMA fashion). More details on a router architecture can be found in, A router architecture for networks on silicon, by Edwin Rijpkema, Kees Goossens, and Paul Wielage, In PROGRESS, October 2001.

The network interfaces are connected to an IP block (intellectual property), which may represent any kind of data processing unit or also be a memory, bridge, etc. In particular, the network interfaces constitute a communication interface between the IP blocks and the network. The interface is usually compatible with the existing bus interfaces. Accordingly, the network interfaces are designed to handle data sequentialization (fitting the offered command, flags, address, and data on a fixed-width (e.g., 32 bits) signal group) and packetization (adding the packet headers and trailers needed internally by the network). The network interfaces may also implement packet scheduling, which can include timing guarantees and admission control.

On-chip systems often require timing guarantees for their interconnect communication. Therefore, a class of communication is provided, in which throughput, latency and jitter are guaranteed Connections are used to identify different traffic classes and associate properties to them.

A cost-effective way of providing time-related guarantees (i.e., throughput, latency and jitter) is to use pipelined circuits in a TDMA (Time Division Multiple Access) fashion, which is advantageous as it requires less buffer space compared to rate-based and deadline-based schemes on systems on chip (SoC) which have tight synchronization.

Typically, a network interface comprises a slot table whose entries are cyclically read. If an entry is reserved for a channel, data for that channel is allowed to enter the network. The allocation of the entries within the slot table are performed such that data elements do not collide, i.e. a contention free routing scheme is applied.

At each slot, a data item is moved from one network component to the next one, i.e. between routers or between a router and a network interface. Therefore, when a slot is reserved at an output port, the next slot must be reserved on the following output port along the path between an master and a slave module, and so on.

When multiple connections with timing guarantees are set up, the slot allocation must be performed such that there are no clashes (i.e., there is no slot allocated to more than one connection). The task of finding an optimum slot allocation for a given network topology i.e. a given number of routers and network interfaces, and a set of connections between IP blocks is a highly computational-intensive problem as it involves finding an optimal solution which requires exhaustive computation time.

FIG. 6 shows a block diagram of a part of a network on chip according to the prior art. Here, three network interfaces NI1-NI3 and two routers R1, R2 are shown. The network interfaces NI1-NI3 are connected to the two routers R1, R2. The system comprises seven channels, wherein four channels a, b, c and d extend from the first network interface NI1 to the third network interface NI3 and three channels k, l and m extend from the second network interface NI2 to the third network interface NI3.

Each of the links L1-L4 between the network interfaces and the routers are associated to two slot tables. The slot tables ST11, ST21, ST31 and ST41 each comprise nine slots, while the slot tables ST12, ST22, ST32 and ST42 each comprise sixteen slots.

It is assumed that the bandwidth requirement in terms of a fraction of the link capacity for the channels is $B_a=5/16$, and $B_b=B_c=B_d=B_k=B_l=B_m=1/16$. As the link L2 from the second router R2 to the third network interface NI3 needs to accommodate all seven connections, at least seven slots are required in the slot tables ST21, ST22 associated to the network interfaces and the routers. If the slot tables ST1-ST32 comprise each S slots, six of these slots need to be reserved for the six channels b-m. Accordingly, the number of slots left over for channel A is S-6 such that a reserved bandwidth fraction for the channel a is S-6/S which should be larger or equal to the specified requirement of 5/16 bandwidth. Hence, S must be at least 9. The reservation of s slots in a slot table with S results in a fraction of s/S of the total bandwidth capacity of a link.

If a slot table with nine slots is chosen, a minimum amount of slots can be allocated. Some of the available bandwidth is wasted as all slots are occupied, but only 11/16 of the link bandwidth is actually required, i.e. the waste of bandwidth is more than 30%. However, if a slot table with 16 slots is selected, the waste of bandwidth will be avoided but this comes at a higher cost for the slot tables as they are larger.

It is an object of the invention to provide an electronic device and a method of communication resource allocation with an improved and cost effective allocation of communication resources.

This object is solved by an electronic device according to claim 1 and a method of communication resource allocation according to claim 8.

Therefore, an electronic device is provided which comprises an interconnect means for coupling a plurality of processing modules to enable a communication between the processing modules. The electronic device further comprises a plurality of network interfaces for coupling the interconnect means to one of the processing modules. Furthermore, at least one time slot allocating unit is provided for allocating time slots to channels of the interconnect means. The time slot allocating unit comprises a plurality of slot tables with a plurality of entries. Each entry corresponds to a fraction of the available bandwidth of the interconnect means. A first slot table of the plurality of slot tables comprises at least one first entry of the plurality of entries which relates to a second slot table of the plurality of slot tables.

By introducing a hierarchy in the slot tables, different amounts of bandwidths can be allocated to a time slot. Accordingly, waste of bandwidth can be reduced significantly.

According to an aspect of the invention, all entries of the second slot table being referred to by the first entry are allocated during a fraction of bandwidth being associated to the first entry.

According to a further aspect of the invention, the time slot allocating units can be arranged in the network interfaces in order to provide an efficient time slot allocating mechanism.

According to a further aspect of the invention, the interconnect means comprises a plurality of routers. At least one of these routers may comprise a time slot allocating unit to further improve the time slot allocating mechanism.

The invention relates to the idea to introduce a hierarchy within the slot tables arranged in a system on chip. This can be performed by nesting the slot tables such that a different amount of bandwidth can be allocated or associated to the slots within a slot table. Hence, the required bandwidth of a channel can be allocated by using slots with different bandwidths.

Other aspects of the invention are defined in the dependent claims.

The invention is now described in more detail with reference to the drawings.

The following embodiments relate to systems on chip, i.e. a plurality of modules on the same die, multiple dies (e.g. system in a package), or on multiple chips communicate with each other via some kind of interconnect. The interconnect is embodied as a network on chip NOC. The network on chip may include wires, bus, time-division multiplexing, switch, and/or routers within a network. At the transport layer of said network, the communication between the modules is performed over connections. A connection is considered as a set of channels, each having a set of connection properties, between a first module and at least one second module. For a connection between a first module and a single second module, the connection may comprises two channels, namely one from the first module to the second module, i.e. the request channel, and a second channel from the second to the first module, i.e. the response channel. Therefore, a connection or the path of the connection through the network, i.e. the connection path comprises at least one channel. In other words, a channel corresponds to the connection path of the connection if only one channel is used. If two channels are used as mentioned above, one channel will provide the connection path e.g. from the master to the slave, while the second channel will provide the connection path from the slave to the master. Accordingly, for a typical connection, the connection path will comprise two channels. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
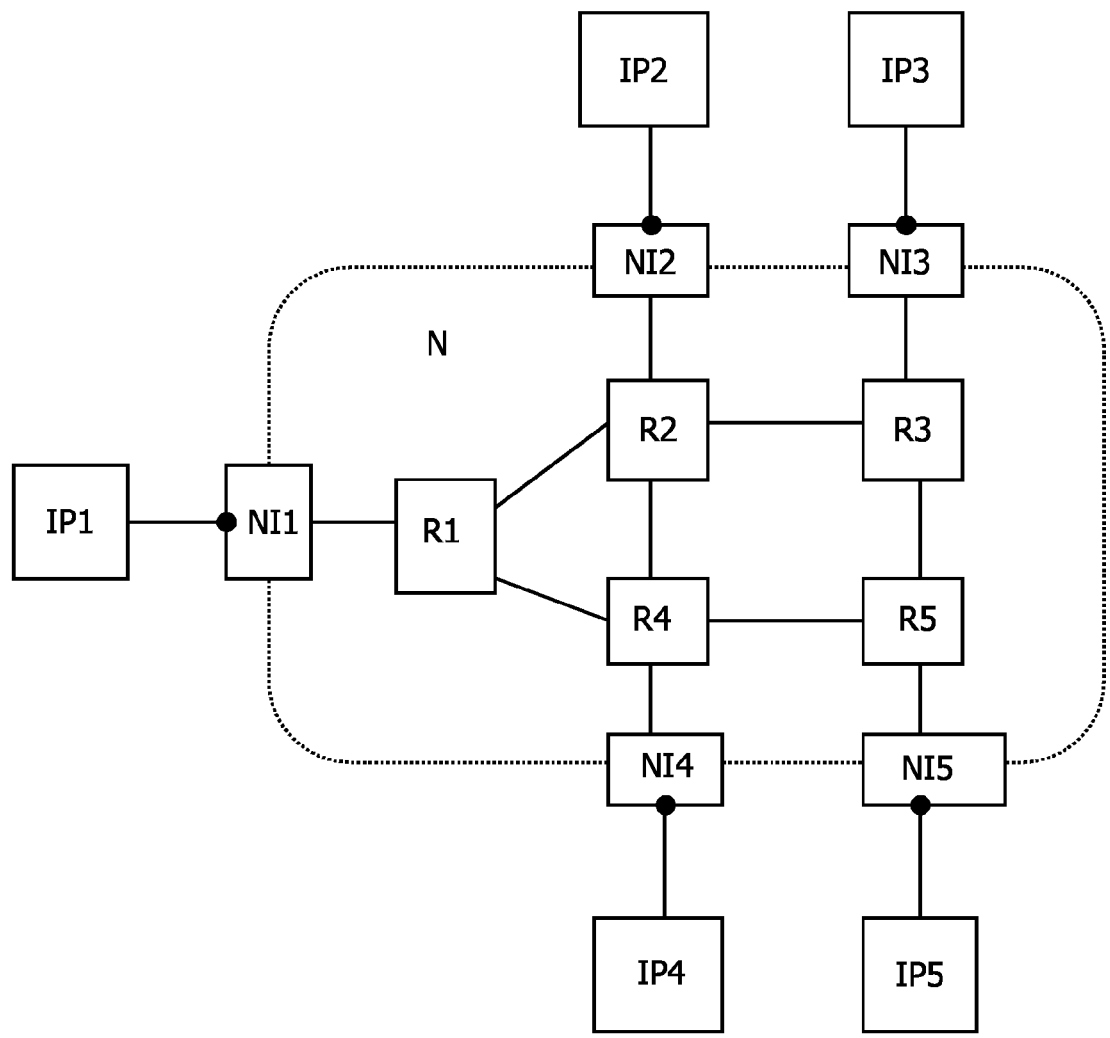
FIG. 1 shows a block diagram of the basic structure of a network on chip according to the invention.

FIG. 1 shows a block diagram of a general network on chip architecture according to the present invention. The system comprises several so-called intellectual property blocks IPs IP1-IP5 (computation elements, memories or a subsystem which may internally contain interconnect modules) which are each connected to a network N via a network interface NI, respectively. The network N comprises a plurality of routers R1-R5, which are connected to adjacent routers via respective network links.

The network interfaces NI1-NI5 are used as interfaces between the IP blocks IP1-IP5 and the network N. The network interfaces NI1-NI5 are provided to manage the communication of the respective IP blocks IP1-IP5 and the network N, so that the IP blocks IP1-IP5 can perform their dedicated operation without having to deal with the communication with the network N or other IP blocks. The IP blocks IP1-IP5 may act as masters, i.e. initiating a request, or may act as slaves, i.e. receiving a request from a master and processing the request accordingly.

Figure 2:
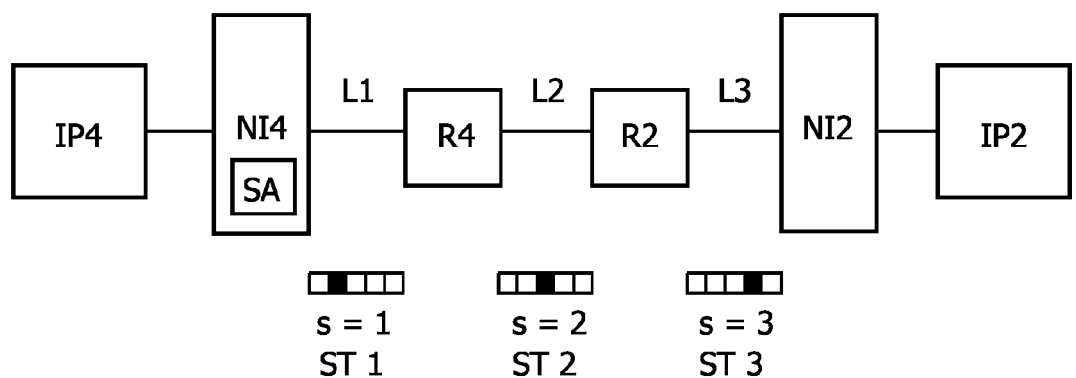
FIG. 2 shows a block diagram of a basic slot allocation for a connection in a network according to FIG. 1.

FIG. 2 shows a block diagram of a connection and a basic slot allocation in a network on chip according to FIG. 1. In particular, the connection between the IP block IP4 and IP2 is shown. This connection is realized by a network interface NI4 associated to the IP block IP4, two routers R4, R2, and a network interface NI2 associated to the IP block IP2. The network interface NI4 comprises a time slot allocation unit SA. Alternatively or additionally, the network interface NI2, and routers R2 and R4 may also comprise a time slot allocation unit SA. A first link L1 is present between the network interface NI4 and a router R4, a second link L2 is present between the two routers R4, R2, and a third link L3 is present between the router R2 and the network interface N12. Three slot tables ST1-ST3 for the output ports of the respective network components are also shown. These slot tables are preferably implemented on the output side, i.e. the data producing side, of the network elements like network interfaces and routers. For each requested slot, one slot is reserved in each slot table of the links along the connection path. All these slots must be free, i.e., not reserved by other channels. Since the data advance from one network component to another each slot, starting from slot s=1, the next slot along the connection must be reserved at slot s=2 and then at slot s=3.

The inputs for the slot allocation determination performed by the time slot allocation unit SA are the network topology, like network components, with their interconnection, and the slot table size, and the connection set. For every connection, its paths and its bandwidth, latency, jitter, and/or slot requirements are given. A connection consists of at least two channels or connection paths (a request channel from master to slave, and a response channel from slave to master). Each of these channels is set on an individual path, and may comprise different links having different bandwidth, latency, jitter, and/or slot requirements. To provide time related guarantees, slots must be reserved for the links. Different slots can be reserved for different connections by means of TDMA. Data for a connection is then transferred over consecutive links along the connection in consecutive slots.

Figure 3:
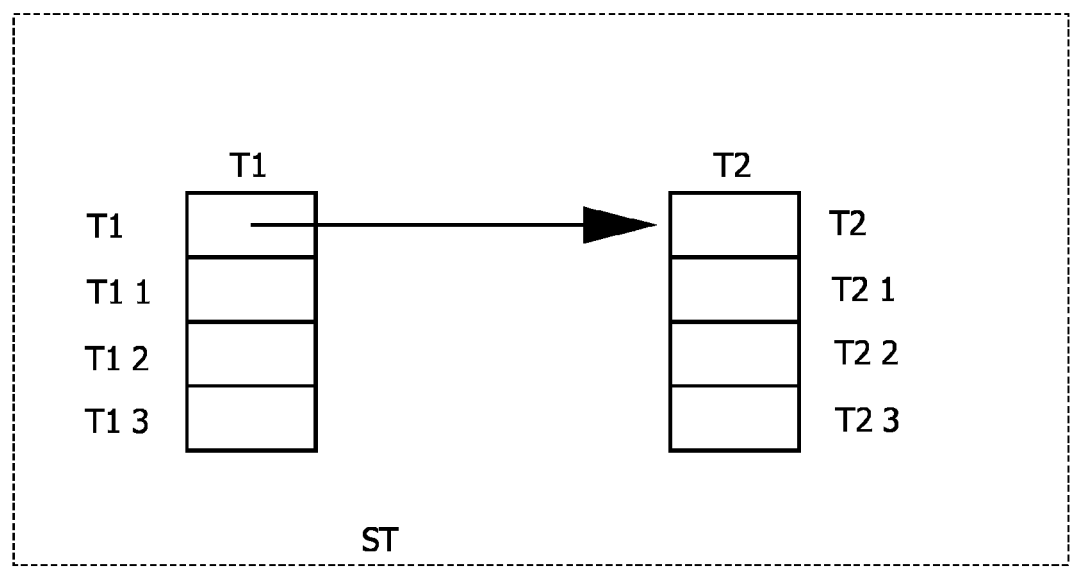
FIG. 3 shows a basic representation of the slot tables according to a first embodiment.

FIG. 3 shows a basic representation of the slot tables according to a first embodiment. Here, the slot table unit STU can be arranged in the slot allocation unit SA and comprises two slot tables T1, T2 which are nested or interleaved. Each of the two slot tables T1, T2 comprises four slots. $i_1$ indicates the $i_1^{TH}$ slot T1 ($i_1$) in the first slot table T1, wherein $i_1$=0, 1, 2, 3. $i_2$ indicates the slots in the second slot table T2.

The slots in the slot table T1, T2 either relate to a terminal slot or to a nested further slot table. The slots of the first slot table T1 (being at the highest level) are traversed cyclically, i.e. each of the slots in the first slot table T1 is associated to the same amount of time and therefore bandwidth. If a slot corresponds to a terminal slot, the corresponding channel (or channel entry referring to a channel) (associated to the slot) can access the network. However, if the current slot is associated to a slot table (here the second slot table T2), the slots of the second slot table T2 are traversed cyclically each time when the first slot table T1 (being above in the nesting structure) has completed one cycle. Accordingly, the slots within a slot table with a nesting depth of n divide the bandwidth of a single slot at a nesting depth of n−1.

The first slot table T1 comprises four slots, wherein each of the slots represents ¼ of the total available link bandwidth. The terminal slots T1 (1), T2 (2) and T1 (3) (relating to themselves) are allocated or associated to the channels a, b and c, i.e. each of these channels has ¼ of the total link bandwidth available. The slot T1 (0) is associated to the second slot table T2, i.e. the slot table is nested to the second slot table S2. Accordingly, the total slot table T2 has ¼ of the link bandwidth available and therefore, each of the slots T2 ($i_2$) with $i_2$=0, 1, 2, 3 has ¼ of the bandwidth of the total second slot table T2 available. Thus, the channels d, f and g each have 1/16 of the link bandwidth available.

The allocation of the link bandwidth as a function of time is depicted by the following possible sequence allocated to the channels:

```
time:
0 1 2 3 4 5 6 7 8 9 10 11 12 13 14 15 . . .

channel:
d a b c e a b c f a  b  c  g  a  b  c  . . .
```

The second slot table T2 is referred for the first time from the first entry T1 (0) and the first entry T2 (0) of the second table T2 (the channel d is selected). Then the channels a, b and c are selected sequentially. The next time at the second cycle of the first slot table T1, the second slot table T2 is again referenced from the first entry (T1 (0)) of the first table T1. Now the arbiter selects the second entry T2 (1), i.e. channel e of the second table T2.

Accordingly, the slot table unit STU (constituted by the nested table) has the same behaviour as a single slot table. Therefore, the slot allocation can be performed as for a slot table unit without nested slot tables, wherein only an extra constraint on the location of the slot is present. If for example slots are to be allocated with 1/16 of the bandwidth, the slots 0, 4, 8 or 12 is needed within the onfolded slot table as depicted above. Furthermore, if slots with ¼ of the link bandwidth is required, slots need to be periodically (with a period of 4) allocated in the slot table.

Additionally or alternatively, multiple slot points to the same lower level slot table are possible. These slots do not need to be in the same table or even at the same level.

Figure 4:
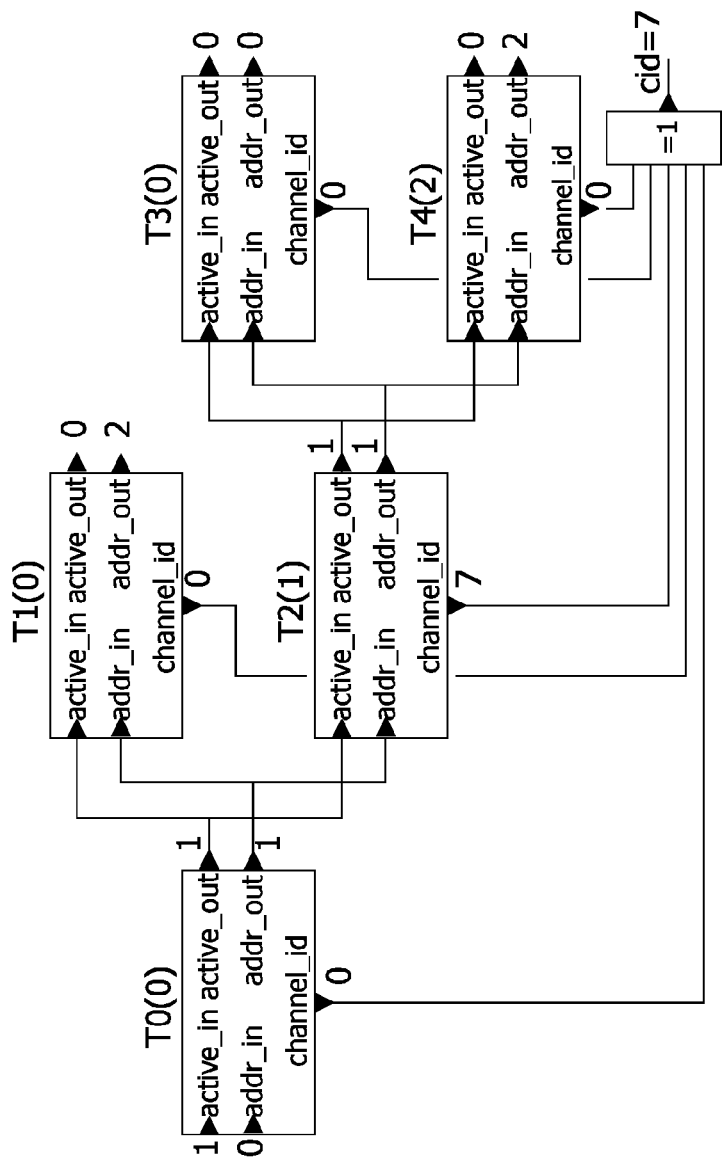
FIG. 4 shows a representation of a slot table unit according to a second embodiment.
Figure 4:
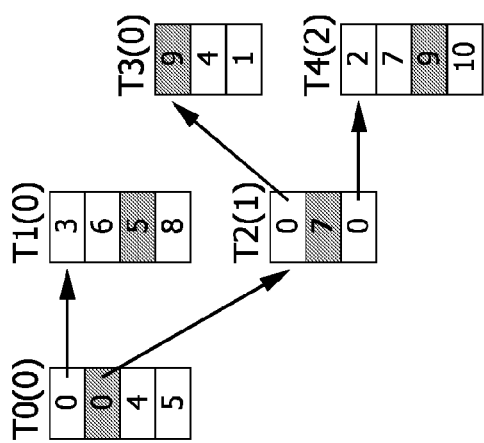

FIG. 4 shows a representation of a slot table unit STU according to a second embodiment. The slot table unit STU comprises five slot tables T0, T1, T2, T3 and T4, which are interconnected in a nested manner. In other words, the nesting structure is fixed with a physical memory per slot table. The memory M is addressed by its address addr and a channel is indicated by M (addr). The size of the memory is represented by "size". Each of the slot tables comprises a pointer "parent to-addr" indicating the address at which it is nested from its parent slot table.

On the left hand side of FIG. 4, the logic representation of the five slot tables T0-T4 is shown together with the logical nesting structure. On the right hand side of FIG. 4, an architecture of the slot table unit STU implementing the nesting structure is shown. Each of the slot tables comprises two inputs, namely active_in and addr_in as well as three outputs, namely active_out, addr_out and channel_id. The active_in/active_out indicate the nesting structure, while the addr_in/addr_out in- and outputs correspond to the address within the slot tables. The output channel_id corresponds to the ID of the respective channel. The slot T0 (0) in the first slot table T0 is associated to the second slot table T1. The slot T0 (1) of the first slot table T1 is associated to the third slot table T2. The slot T2 (0) is associated to the fourth slot table T3. The slot T2(2) is associated to the fifth slot table T4.

A table will become active if its parent slot table is active and when the parent slot table points to the nested slot table. An output channel_ID=0 may indicate that a slot within a slot table is associated to a further nested slot table. Preferably, a single path is present of the active slot table from the route table to a leave table but not necessarily not all the way down to the leave table. The active slot tables but the last slot table within the path comprise an output channel_ID of zero. Accordingly, one active slot table with an output channel_ID being not equal to zero is always present.

A pseudo code for implementing a slot table unit according to the second embodiment is shown below:

```
SlotTable (parent_addr):
    IN active_in
    IN addr_in
    OUT active_out
    OUT addr_out
    OUT channel_id
    addr_out=0;
    foreach (slot_tick)
        active_out <=active_in and (addr_in ==parent_addr);
        channel_id <=M(addr) * active_out;
        addr_out = addr_out + active_out (mod size);
```

The inputs to the slot table units are active_in at addr_in and the outputs are active_out, addr_out and channel_id. Furthermore, the addr_out is set to zero. If the active_out is smaller than or equal to active_in and the addr_in corresponds to the parent_addr and the channel_id is smaller than or equal to the M(addr)*the active_out, then the addr_out corresponds to the addr_out+the active_out in mod size.

If a small programming granularity is required with small memory sizes, the use of a dedicated random access memory for each slot table is not an optimum solution.

According to a third embodiment which may be based on the second embodiment, the slot table unit is implemented using a cyclic shift memory. Accordingly, the content of the shift memory is shifted for one location. The data shifted out of the shift memory is shifted in at the other end of the memory. With such a shift memory, the addressing logic required for random access memory can be avoided. Therefore, the architecture of the slot table unit according to the third embodiment corresponds to the architecture of the slot table unit according to the second embodiment. The slot table unit according to the third embodiment can be implemented by the following pseudo code:

```
SlotTable (parent_addr):
    IN active_in
    IN addr_in
    OUT active_out
    OUT addr_out
    OUT channel_id
    addr_out=0
    foreach (slot_tick)
        active_out<= active_in and (addr_in ==parent_addr);
        channel_id<=M(0) + active:out;
        M <= shift (M);
        M(size-1) <= channel_id;
        addr_out = addr_out + active_out (mod size);
```

Although the output addr_out is still present, it is not used to address the memory, but for a comparison in the slot tables. Alternatively to shifting the data in the shift memory, this may also be implemented by a memory dedicated to an incremental addressing.

According to a fourth embodiment which may be based on the second or third embodiment, the memory can be implemented with an additional bit. Such an extra or additional bit can indicate whether a slot in a slot table is a leave or terminal slot or a pointer to a further slot table. The other bits within such a slot table may correspond to the channel_ID or the slot table ID according to the value of the extra bit. The slot table ID can then be used in the child table or nested table to compare with. Accordingly, such a scheme will allow multiple slots referring to the same child table.

Figure 5:
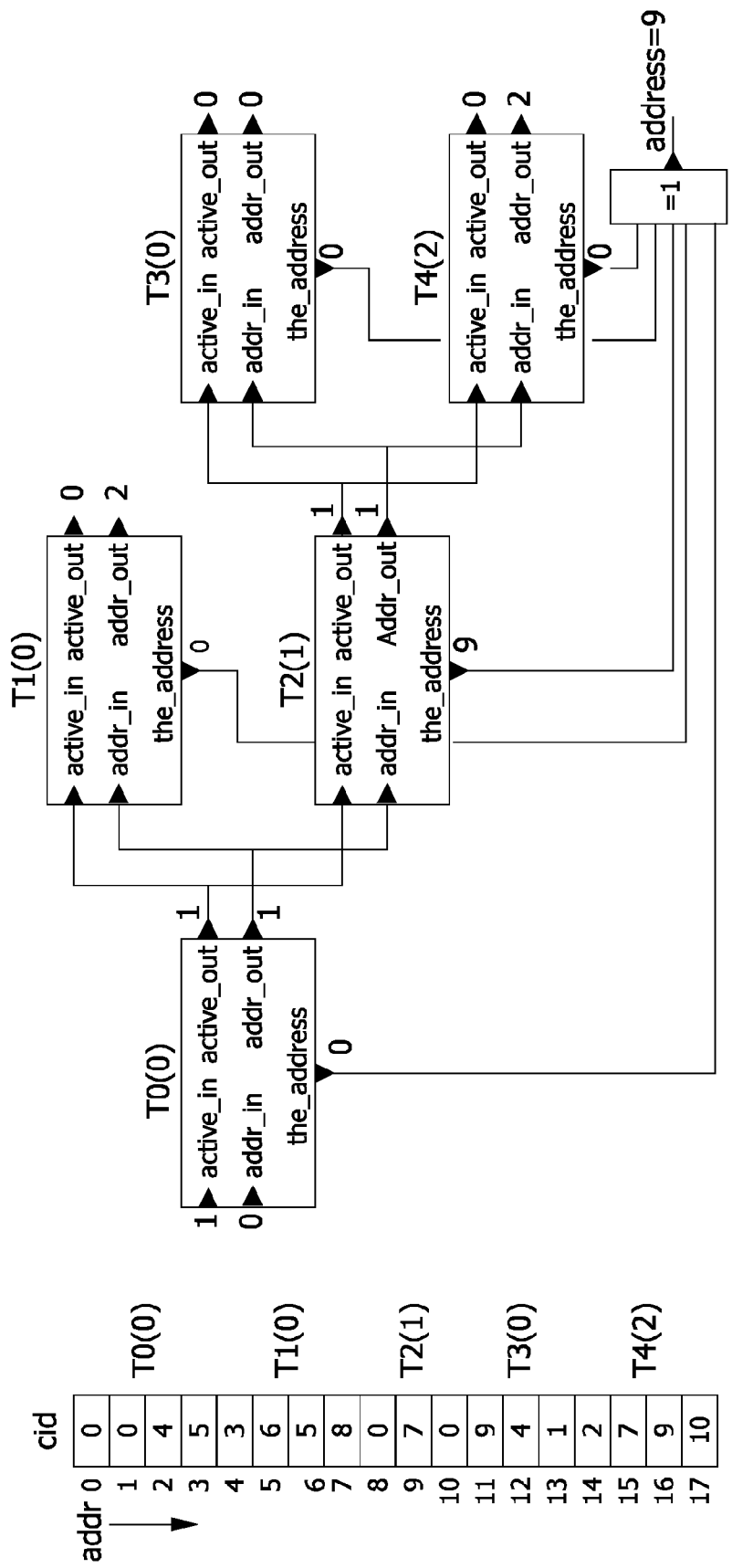
FIG. 5 shows a representation of a slot table unit according to the third embodiment.
Figure 6:
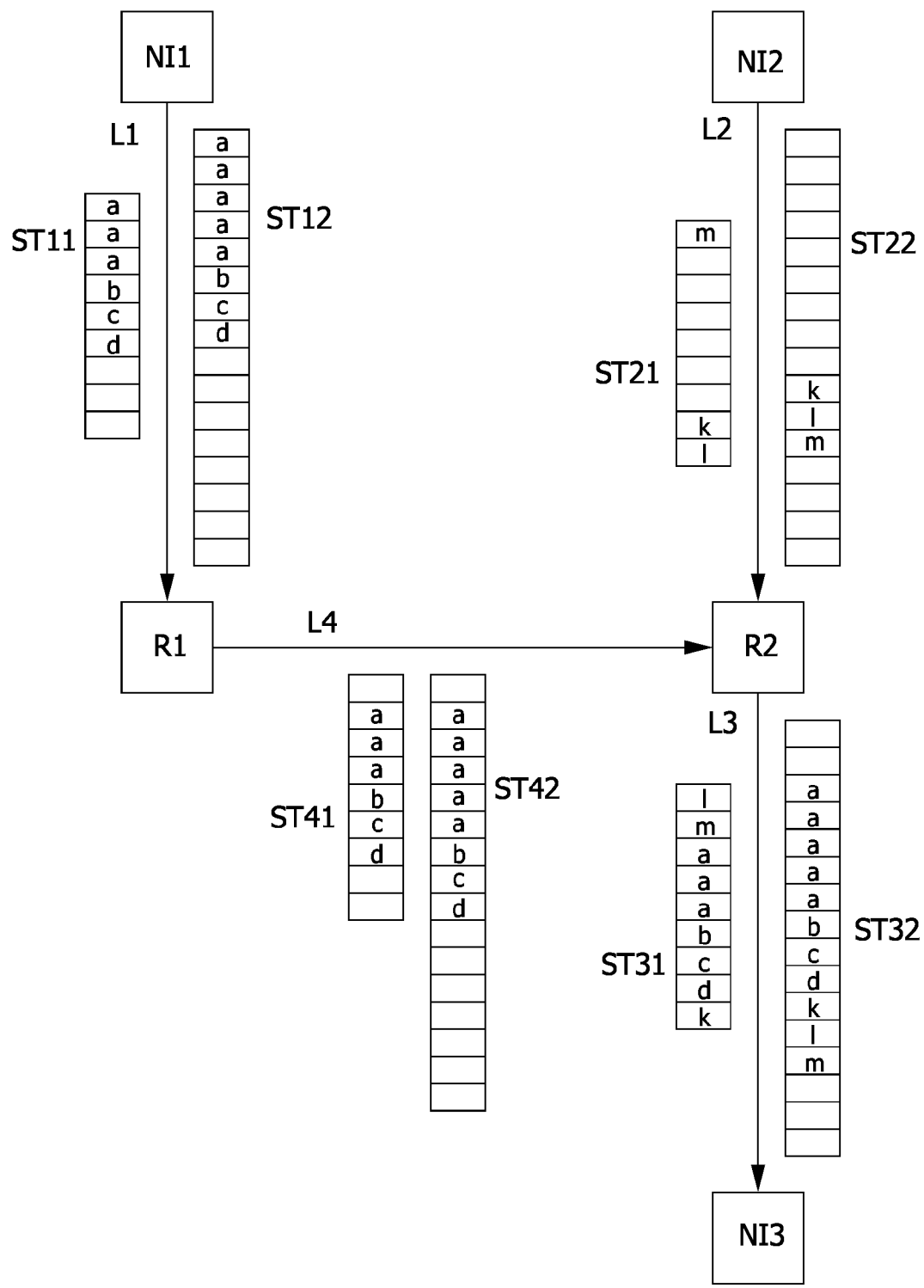
FIG. 6 shows a block diagram of a part of a network on chip according to the prior art.

FIG. 5 shows a representation of a slot table unit according to the fifth embodiment. The fifth embodiment is based on the second embodiment while only a single random access memory is used. The different physical memories per slot table containing the connection IDs are replaced in the slot tables by a vector V indication whether a current slot within the slot table is nested (0) or not (1). The state, the local addresses of the vector V inside the block correspond to those in the second embodiment of FIG. 4. The single memory is achieved by stacking the slot tables T0-T4 on top of each other in the memory. This is shown on the left hand side of FIG. 6. Each entry within the slot tables T0-T4 corresponds to an address addr from zero to 17. The value cumulative_table_size corresponds to the sum of the sizes of the slot tables being embedded in the single memory before the current table. The values thereof for the slot tables T0-T4 correspond to 0, 4, 8, 11 and 14, respectively. The only slot table with a value of 'the_address' being one is the third slot table with a local output address addr_out being one. Accordingly, the address addr equals to nine. This address corresponds to a connection ID of 7.

The slot table unit may be implemented by the following pseudo code:

```
AddressUnit (parent_addr):
    IN active_in
    IN addr_in
    OUT active_out
    OUT addr_out
    OUT the_address
    addr_out = 0;
    foreach (slot_tick)
        active_out <= active_in and (addr_in == parent_addr);
        the_address <= (cumulative_table_size + addr_out) * (v(addr_out)
        and active_out);
            addr_out = addr_out + active_out (mod size);
```

The output address addr_out of the 'or' operation corresponds to the address for the single memory.

The slot table units according to the second to fifth embodiment are based on a fixed structure which is advantageous as it allows a fast computation of the address such that a new connection ID can be computed easily even at a high rate.

According to a sixth embodiment of the invention, the slot table units are based on a programmable structure of the nesting of the slot tables. For example, if a memory comprises sixteen locations, such memory can be partitioned into two tables of eight slot, four tables of four slots and so on. If the structure of the slot table units is to be programmed, the computing of the addresses in order for addressing the single memory is now more difficult.

The values of the cumulative_cable_size is hard-wired or coded, and the interconnect between these units is fixed. A first re-indexing points to table 1, a second re-indexing points to table 2 etc. Preferably, there is no flexible pointer to the table. The pointer is hard-wired.

Usually, the computation of a required address does not have to be performed within a single clock cycle, but within the duration of a slot which may be several clock cycles.

The above described principles of the slot table units can be applied to a system on chip in particular with a network on chip infrastructure. A system on chip with a diverse bandwidth requirement and which needs to be implemented at low cost can greatly benefit from the slot table units according to the above embodiments. One example of such a system is a audio/video processing within a mobile device.

Although in the above embodiments a network on chip has been described as interconnect, the principles of the invention can also be applied to other interconnects like a bus or switches. Furthermore, although in the above embodiments a communication has been described based on time-division multiple access (TDMA) also other communications are possible like a rate based communication or other possibilities to divide the available bandwidth between the respective communications or connections.

The invention relates to a provision of nested slot tables. In a nested slot table, a table entry may be a slot or may refer to a next or following slot table. The bandwidth of an allocated entry in one of the nested tables will depend on the nesting depth of such an entry. Accordingly, a fine granularity can be obtained with only a moderate number of slots required, such that bandwidths can be saved for the same slot table cost or slot table cost can be reduced for the same amount of allocated bandwidth.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An electronic device comprising an interconnection configured to couple a plurality of processing modules to enable a communication between the processing modules;
   a plurality of network interfaces configured to couple the interconnection to one of the processing modules, and
   at least one time slot allocating unit configured to allocate time slots to channels of the interconnection, wherein the time slot allocating unit comprises a plurality of slot tables, each comprising a plurality of entries, wherein each entry corresponds to a fraction of the available bandwidth of the interconnection,
   wherein a first slot table of the plurality of slot tables comprises at least one first entry of the plurality of entries referring to a nested second slot table of the plurality of slot tables, and wherein a combined available bandwidth for all entries of the nested second slot table corresponds to an available bandwidth of the first entry of the first slot table.

2. An electronic device in accordance with claim 1, wherein all entries in the nested second slot table are allocated during the fraction of bandwidth associated to the first entry.

3. An electronic device in accordance with claim 1, wherein at least one of the time slot allocating units is arranged in at least one of said plurality of network interfaces.

4. An electronic device in accordance with claim 1, wherein the interconnection comprises a plurality of routers, wherein at least one of the time slot allocating units is arranged in at least one of the routers.

5. An electronic device in accordance with claim 2, wherein the plurality of slot tables is implemented as a cyclic shift memory.

6. An electronic device in accordance with claim 2, wherein at least one of the plurality of slot tables comprises an additional bit for indicating whether an entry within the slot table corresponds to a first entry relating to another slot table or to a second entry being a terminal time slot.

7. An electronic device in accordance with claim 1, wherein the slot tables are arranged in a memory by stacking the slot tables on top of each other.

8. Method for allocating communication resources within an electronic device with a plurality of network interfaces coupled to an interconnection configured to enable a communication between processing modules comprising:
   allocating time slots to channels of the interconnection, using a plurality of slot tables, wherein each slot table comprises a plurality of entries each of which corresponds to a fraction of the available bandwidth of the interconnection, wherein one of the entries of one of the plurality of slot tables refers to a nested second slot table of the plurality of slot tables, and wherein a combined bandwidth for all entries of the nested second slot table corresponds to an available bandwidth of the first entry of the first slot table.

9. A method in accordance with claim 8, wherein all entries in the nested second slot table are allocated during the fraction of bandwidth associated to the fist entry.

10. A method in accordance with claim 8, wherein at least one of the time slot allocating units is arranged in at least one of said plurality of network interfaces.

11. A method in accordance with claim 8, wherein the interconnection comprises a plurality of routers, wherein at least one of the time slot allocating units is arranged in at least one of the routers.

12. A method in accordance with claim 9, wherein the plurality of slot tables is implemented as a cyclic shift memory.

13. A method in accordance with claim 9, wherein at least one of the plurality of slot tables comprises an additional bit for indicating whether an entry within the slot table corresponds to a first entry relating to another slot table or to a second entry being a terminal time slot.

14. A method in accordance with claim 8, wherein the slot tables are arranged in a memory by stacking the slot tables on top of each other.

15. A method in accordance with claim 8, wherein the nested second slot table introduces a hierarchy of slot tables, and wherein the bandwidth of an allocated entry in one of the nested tables will depend on the nesting depth of the entry.

16. An electronic device in accordance with claim 1, wherein the nested second slot table introduces a hierarchy of slot tables, and wherein the bandwidth of an allocated entry in one of the nested tables will depend on the nesting depth of the entry.

17. A data processing system comprising:
   a plurality of processing modules; and
   an electronic device comprising:
      an interconnection configured to couple the plurality of processing modules to enable communication between the processing modules,
      a plurality of network interfaces configured to couple the interconnection to one of the processing modules, and
      a time slot allocating unit configured to allocate time slots to channels of the interconnection, wherein the time slot allocating unit comprises a plurality of slot tables, each comprising a plurality of entries, wherein each entry corresponds to a fraction of the available bandwidth of the interconnection, wherein a first slot table of the plurality of slot tables comprises at least one first entry of the plurality of entries referring to a nested second slot table of the plurality of slot tables, and wherein a combined available bandwidth for all entries of the nested second slot table corresponds to an available bandwidth of the first entry of the first slot table.

18. A system in accordance with claim 17, wherein all entries in the nested second slot table are allocated during the fraction of bandwidth associated to the first entry.

19. A system in accordance with claim 17, wherein at least one of the time slot allocating units is arranged in at least one of said plurality of network interfaces.

20. A system in accordance with claim 17, wherein the nested second slot table introduces a hierarchy of slot tables, and wherein the bandwidth of an allocated entry up one of the nested tables will depend on the nesting depth of the entry.

* * * * *